(12) United States Patent
Maneparambil et al.

(10) Patent No.: US 6,990,621 B2
(45) Date of Patent: Jan. 24, 2006

(54) ENABLING AT SPEED APPLICATION OF TEST PATTERNS ASSOCIATED WITH A WIDE TESTER INTERFACE ON A LOW PIN COUNT TESTER

(75) Inventors: Kailasnath S. Maneparambil, Chandler, AZ (US); Praveen K. Parvathala, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 468 days.

(21) Appl. No.: 10/326,723

(22) Filed: Dec. 20, 2002

(65) Prior Publication Data

US 2004/0153799 A1  Aug. 5, 2004

(51) Int. Cl.
*G06F 11/00* (2006.01)

(52) U.S. Cl. .................. 714/742; 714/724; 714/25; 714/30

(58) Field of Classification Search ............... 714/742, 714/738, 724, 3, 25, 30, 27, 43, 45, 56, 100, 714/715

See application file for complete search history.

(56) References Cited

U.S. PATENT DOCUMENTS

| | | | | |
|---|---|---|---|---|
| 4,100,601 A | * | 7/1978 | Kaufman et al. | 710/32 |
| 5,136,590 A | * | 8/1992 | Polstra et al. | 714/29 |
| 5,586,279 A | * | 12/1996 | Pardo et al. | 711/3 |
| 5,793,945 A | * | 8/1998 | Tabata et al. | 714/25 |
| 5,905,737 A | * | 5/1999 | Osawa et al. | 714/726 |
| 6,763,385 B1 | * | 7/2004 | Orfali | 709/224 |
| 6,782,331 B2 | * | 8/2004 | Ayadi | 702/68 |

* cited by examiner

*Primary Examiner*—Guy Lamarre
*Assistant Examiner*—Dipakkumar Gandhi
(74) *Attorney, Agent, or Firm*—Buckley, Maschoff & Talwalkar LLC

(57) ABSTRACT

According to some embodiments, at speed application of test patterns associated with a wide tester interface are enabled on a low pin count tester. For example, an integrated circuit might include a processor core to exchange information via input and output paths (e.g., the paths might be associated with a bus external to the integrated circuit). The integrated circuit might also include a cache structure to store test information and a sequencer to transfer the test information from the cache structure. According to some embodiments, a multiplexer receives sets of signals from (i) at least a portion of the bus and (ii) the sequencer. Moreover, the multiplexer might provide one of the received sets of signals to the processor core via the input paths.

18 Claims, 9 Drawing Sheets

DEVICE UNDER TEST

ENABLING AT SPEED APPLICATION OF TEST PATTERNS ASSOCIATED WITH A WIDE TESTER INTERFACE ON A LOW PIN COUNT TESTER

BACKGROUND

A device may be evaluated to ensure that is operates properly. For example, a processor might be tested to ensure that it receives, processes, and provides information properly. FIG. 1 is a diagram of a known functional testing system 100 in which a device under test 110 is evaluated by a functional tester 150. In particular, the functional tester 150 has a wide tester interface. That is, the function tester 150 exchanges information with the device under test 110 via all (or substantially all) of the input and output paths (e.g., pins) that comprise the device's bus 120.

There are a number of disadvantages, however, associated with a functional tester 150. For example, the bus 120 may include a large number of input and output paths. Moreover, the functional tester 150 may need to provide and/or receive information via each of the paths at the full speed of the bus 120. As a result, the design and construction of the functional tester 150 can be costly and time consuming. For example, a functional tester 150 that evaluates a processor might need to exchange information via a 300-pin bus at 533 Mega Hertz (MHz). As a result, a large number of ultra-high speed components (e.g., GaAs components) may need to be incorporated in the functional tester 150.

As another approach, FIG. 2 is a diagram of a known structural testing system 200 in which a device under test 210 is evaluated by a structural tester 250. In this case, the structural tester 250 exchanges information with the device under test 210 via a test bus 260 that includes only a subset of the paths in the bus 220. For example, a 128-pin test bus 260 might be used exchange information with a processor that has a 300-pin bus. Moreover, the structural tester 250 (e.g., a low pin count tester) may exchange information via the test bus 260 at a speed less than the full speed of the bus 220. Although the design and construction of a structural tester 250 can be less expensive and time consuming as compared to a functional tester 150, the evaluation of the device under test 210 may be less thorough. For example, because not all of the paths in the bus 220 are used, some logic paths in the device under test 210 may not be fully evaluated.

As still another approach, it is known that the structural tester 250 can use the test bus 260 to load a set of instructions into a local memory of the device under test 210 (e.g., in a cache structure). The device under test 210 then executes the instructions when the test is performed. Defining an appropriate set of instructions, however, can be difficult (e.g., because a system trace of the entire bus 220 is not easily translated into a set of appropriate instructions). Moreover, it might not be possible to evaluate some portions of the device under test 210 in this way (e.g., portions associated with input and output paths that comprise the entire bus 220).

DETAILED DESCRIPTION

Some embodiments described herein are associated with a "device under test." As used herein, the phrase "device under test" may refer to, for example, a processor such as a network processor or a general purpose processor.

Device Under Test

Figure 1:
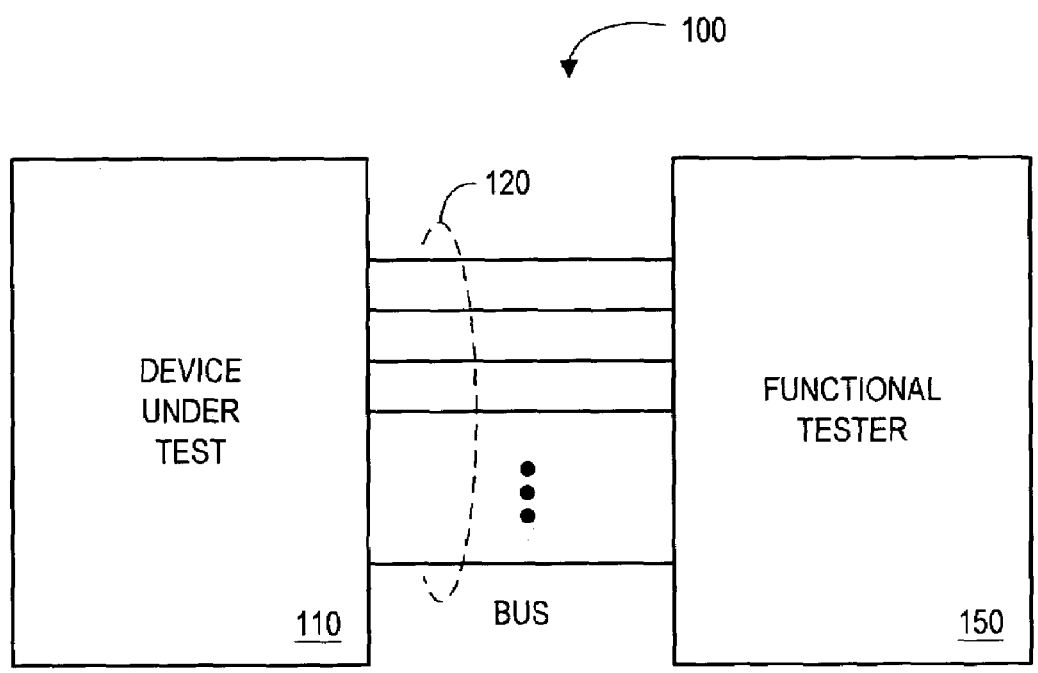
FIG. 1 is a diagram including a known functional tester.
Figure 2:
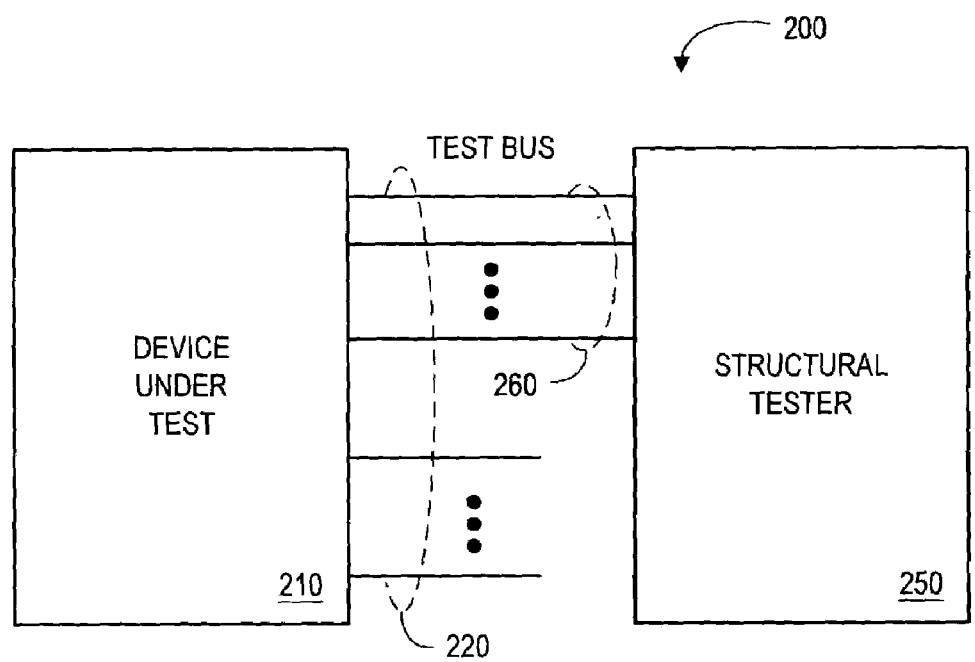
FIG. 2 is a diagram including a known structural tester.
Figure 3:
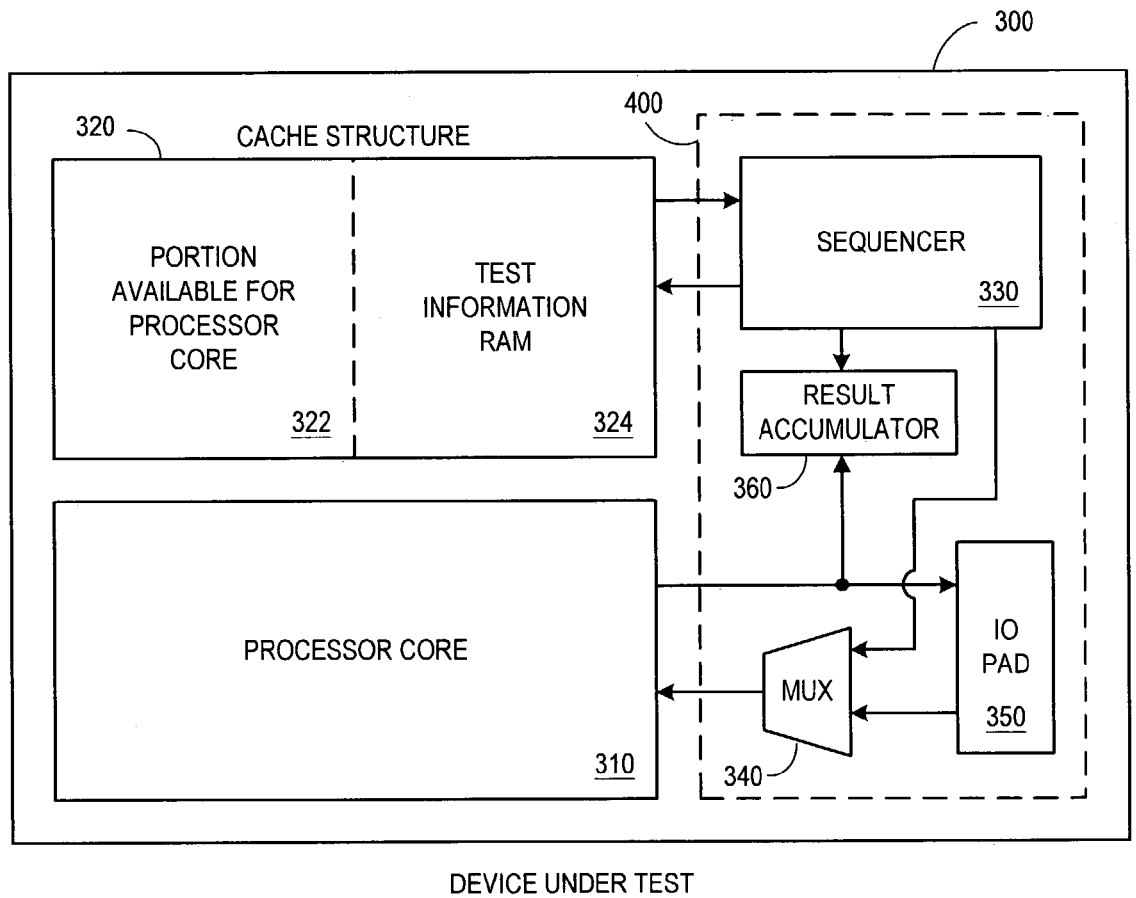
FIG. 3 is a block diagram of a device under test according to some embodiments.

FIG. 3 is a block diagram of a device under test 300 according to some embodiments. In particular, the device under test 300 includes a processor core 310 that may be used to process information. The device under test 300 also includes a cache structure 320 or a local memory located on the same die as the processor core 310. The cache structure 320 includes a first portion 322 that is available for use by the processor core 310 when a test is performed (i.e., to store and retrieve information).

According to some embodiments, the cache structure 320 also includes a second portion 324 that is used to store test information. The test information may, for example, be loaded into the second portion 324 from a structural test device.

In addition, Design For Test (DFT) logic 400 may be provided (e.g., on the same die as the processor core 310 and the cache structure 320) to facilitate the evaluation of the device under test 300. In particular, the DFT logic 400 may include a sequencer 330 that transfers test information from the cache structure 320 to the processor core 310 via paths associated with the device's interface or "bus." As used herein, the term "bus" may refer to, for example, a number of input paths (i.e., associated with pins through which the device under test 300 receives information) and a number of output paths (i.e., associated with pins through which the device under test 300 provides information). By way of example, a bus may comprise a Front Side Bus (FSB) that is used to exchange information between the device under test 300 and other system components (e.g., a chipset).

According to some embodiments, the sequencer 300 transfers test information from the cache structure 320 to the processor core 310 via a multiplexer 340. The multiplexer 340 may also be adapted to transfer actual bus information from an Input Output (IO) pad 350 to the processor core 310 (i.e., when the device under test 300 is used in normal operation and not in test mode). Note that the processor core 310 may also provide information to the bus via the IO pad 350.

The DFT logic 400 may further include a result accumulator 360 that receives information from the processor core 310 (e.g., through the output paths of the bus). The result accumulator may also receive from the sequencer 330 mask information indicating which output paths currently have valid information (e.g., information that should be accumulated). By way of example, the result accumulator 360 may comprise a Multi-Input Signature Register (MISR) adapted to store test result information (e.g., a signature associated with a test). According to other embodiments, the DFT logic 400 instead includes a comparator that evaluates the functionality and/or performance of the device under test 300.

Test Method

Figure 4:
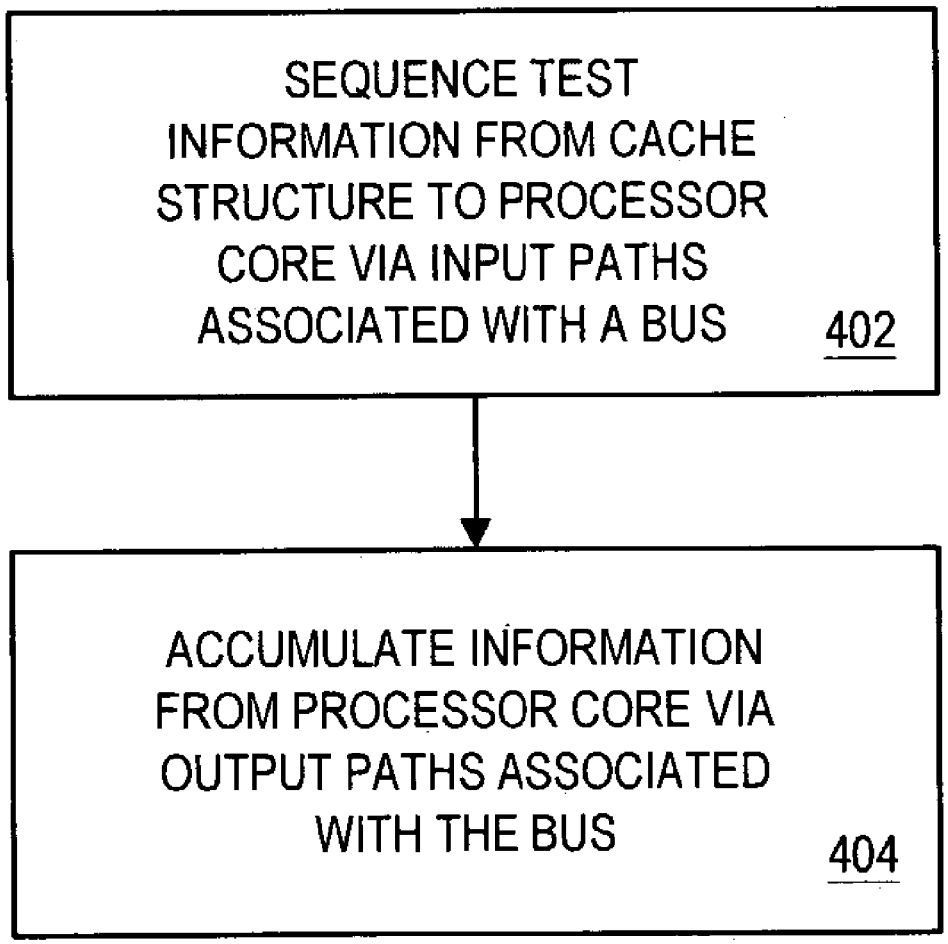
FIG. 4 is a flow chart of a method according to some embodiments.

FIG. 4 is a flow chart of a test method according to some embodiments. The flow charts described herein do not imply a fixed order to the actions, and embodiments may be practiced in any order that is practicable. The method may be associated with, for example, the device under test 300 illustrated in FIG. 3.

At 402, test information is sequenced from the cache structure 320 to the processor core 310 via input paths associated with the bus. For example, the sequencer 300 may receive test information from a particular address in the cache structure 320 and use the received information to drive the input paths via the multiplexer 340. The test information may comprise, for example, test pattern information or test stimuli associated with a system bus trace. The test information may also include mask information indicating which output paths will contain valid information.

The processor core 310 would then process the information received via the input paths (perhaps using the first portion 322 of the cache structure 320) and generate information that is provided via the output paths.

At 404, information from the processor core 310 is accumulated via output paths associated with the bus. For example, the result accumulator 360 may receive the information from the processor core 310 along with mask information from the sequencer 330. Based on the received information, the result accumulator may update a locally stored value (e.g., a signature associated with a test result).

The process illustrated in FIG. 4 may be repeated for additional lines of information in the cache structure 320 (with the result accumulator 360 continuing to update the signature). When the evaluation is complete, the value in the result accumulator 360 may be compared to a pre-determined value (e.g., after being read by a structural tester) to determine if the device under test 300 is operating properly. Note that the input paths and the output paths used by the DFT logic may represent substantially the entire bus. Also note that during the evaluation information may be exchanged over the input and output paths at substantially the full speed of the bus (although the loading of test information into the cache structure 320 and the reading of test result information from the result accumulator 360 may be performed using less than the entire bus and at a slower speed).

EXAMPLE

Figure 5:
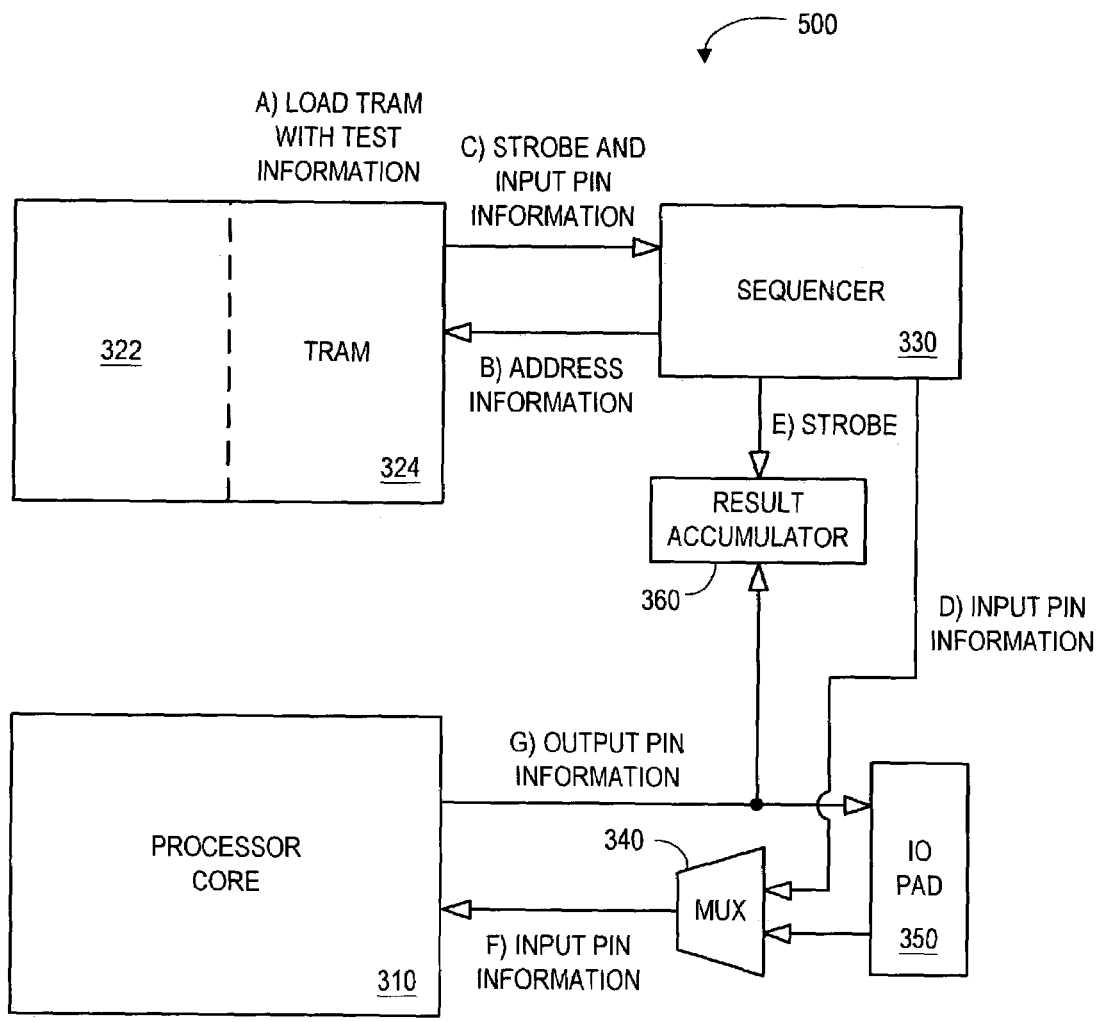
FIG. 5 is an information flow diagram in accordance with an example of the present invention.

FIG. 5 is an information flow diagram 500 in accordance with an example of the present invention. At (A), the Test RAM (TRAM) 324 is loaded with test information. For example, a structural tester might load test information into the TRAM via a test bus that comprises substantially fewer pins as compared to a processor's entire FSB (e.g., a processor having a 300-pin FSB might be tested using a 128-pin or 32-pin test bus). Note that the test information may be loaded in a mode at a speed less than the full speed of the FSB.

The information stored in the TRAM 324 may include, for example, input pin information (e.g., associated with a system bus trace) and strobe information that indicates whether or not each output pin will contain valid information. By way of example, consider a FSB having four pins: P1 (output), P2 (input), P3 (input), and P4 (output). In this case, a line of cache information in the TRAM 324 might indicate "N01S" where: "N" (no strobe) indicates that the value of P1 should ignored; "01" indicates that P2 and P3 should be driven to "0" and "1" respectively; and "S" (strobe) indicates that the value of P4 should be accumulated. Note that the expected value of output pin P4 might not be stored in the TRAM 324. Also note that "S" or "N" may be stored using a binary value.

At (B), the sequencer 330 provides address information to select a line of information in the TRAM 324 (e.g., the sequencer 330 may drive TRAM 324 address lines to sequentially select successive lines from the TRAM 324).

The selected line of information is then sent from the TRAM 324 to the sequencer 330 at (C). The information sent from the TRAM 324 to the sequencer 330 may include, for example, input pin information that the sequencer 330 routes to the multiplexer 340 at (D). In the previous example, "N01S" might be sent from the TRAM 324 to the sequencer 330. In this case, the sequencer 330 would route "01" to the multiplexer 340 (for eventual delivery to the processor core 310 via input paths associated with P2 and P3).

At (E), the sequencer 330 provides the strobe information to the result accumulator 360 (e.g., so that only valid information will be accumulated). In this example, the sequencer 330 would route "N" and "S" to the result accumulator 360 to indicate that valid test information should be captured and accumulated via an output path associated with P4.

The multiplexer 340 routes the input pin information (e.g., "01") to the processor core 310 at (F). The processor core 310 may then execute instructions and process information accordingly. As a result, the processor core 310 generates and provides output pin information to the result accumulator 360 at (G). Based on the output pin information and the strobe information, the result accumulator updates a test signature as appropriate. For example, the result accumulator 360 might AND m strobe bits (e.g., each representing "S" or "N") with associated output pin information and update a test signature via a MISR.

The process may be repeated for additional lines of information in the cache structure 320 (with the result accumulator 360 continuing to update the test signature). When the evaluation is complete, the value in the result accumulator 360 may be read by the structural tester (e.g., via the test bus) to determine if the device under test is operating properly.

Structural Tester

Figure 6:
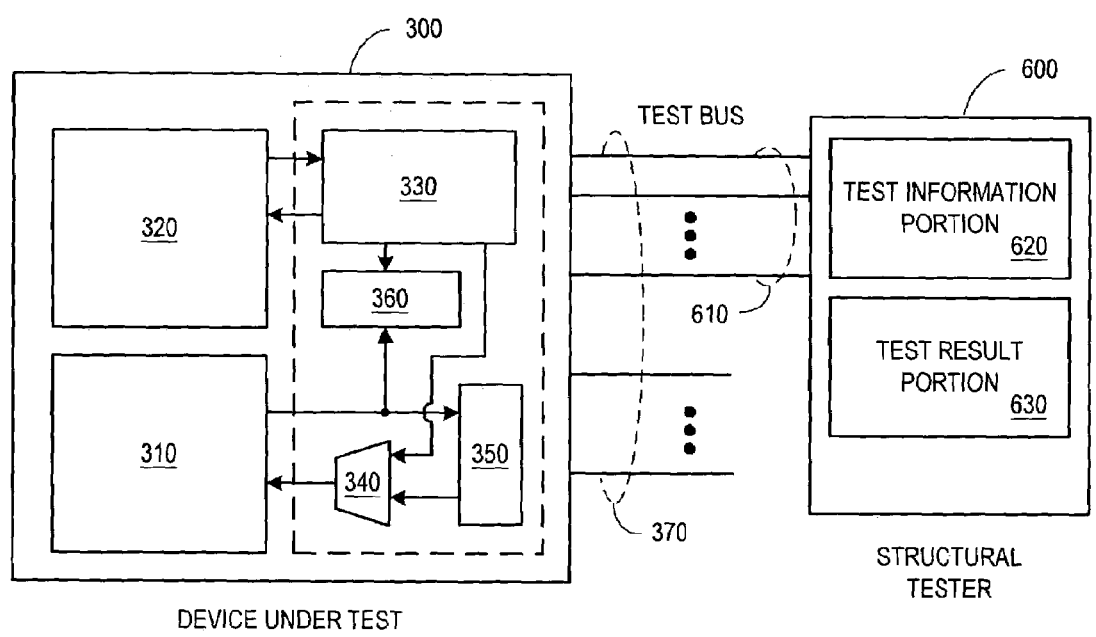
FIG. 6 is a diagram including a device under test and a structural tester according to some embodiments.

FIG. 6 is a diagram including a device under test 300 and a structural tester 600 according to some embodiments. The structural tester 600 may comprise, for example, an Automated Test Equipment (ATE) device. Note that the structural tester 600 exchanges information with the device under test 300 via a test bus 610 having paths (i.e., input and output paths) that represent substantially less than the total number of paths that comprise the bus 370 of the device under test 300.

According to some embodiments, the structural tester 600 includes a test information portion 620 that provides test information adapted to be stored in a cache structure 320 of the device under test 300. For example, the test information portion 620 may store input test information (e.g., associated with input paths) adapted to be stored in lines of the cache structure 320. The test information portion 620 may also store mask information (e.g., strobe information indicating which output paths will contain valid information) and/or address sequencing information.

The structural tester 600 may also include a test result portion 630 that receives from the device under test 300 information associated with a test result. For example, the test result portion 630 may receive a test signature from the device under test 300. The test result portion 630 may also compare the test signature to a pre-determined signature to determine whether or not the device under test 300 is operating properly. According to other embodiments, the device under test 300 performs this comparison instead (e.g., and reports a simple pass or fail indication to the structural tester 600).

Figure 7:
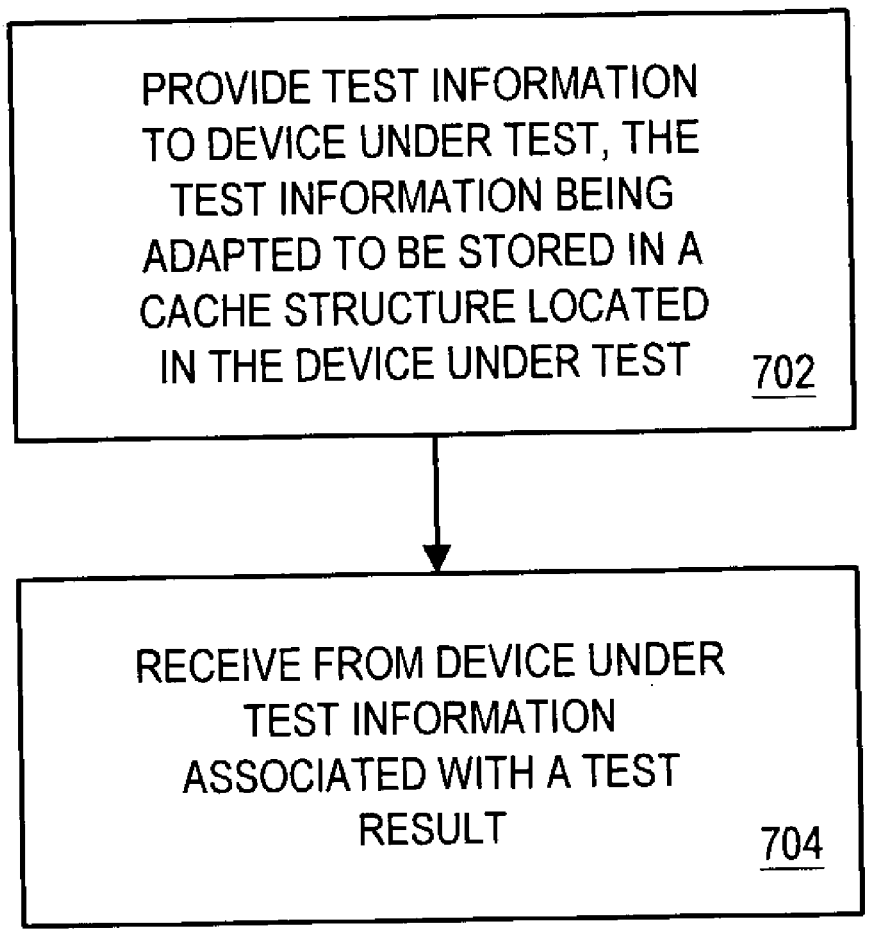
FIG. 7 is a flow chart of a structural tester method according to some embodiments.

FIG. 7 is a flow chart of a structural tester method according to some embodiments. The method may be performed, for example, by the structural tester 600 illustrated in FIG. 6. At 702, test information is provided to a device under test 300, the test information being adapted to be stored in a cache structure 320 located in the device under test 300. For example, the test information portion 620 of the structural tester 600 may transmit the test information via the test bus 610.

At 704, information associated with a test result is received from the device under test 300. For example, the test result portion 630 of the structural tester 600 may receive a test signature via the test bus 610.

Test Information Generation

Figure 8:
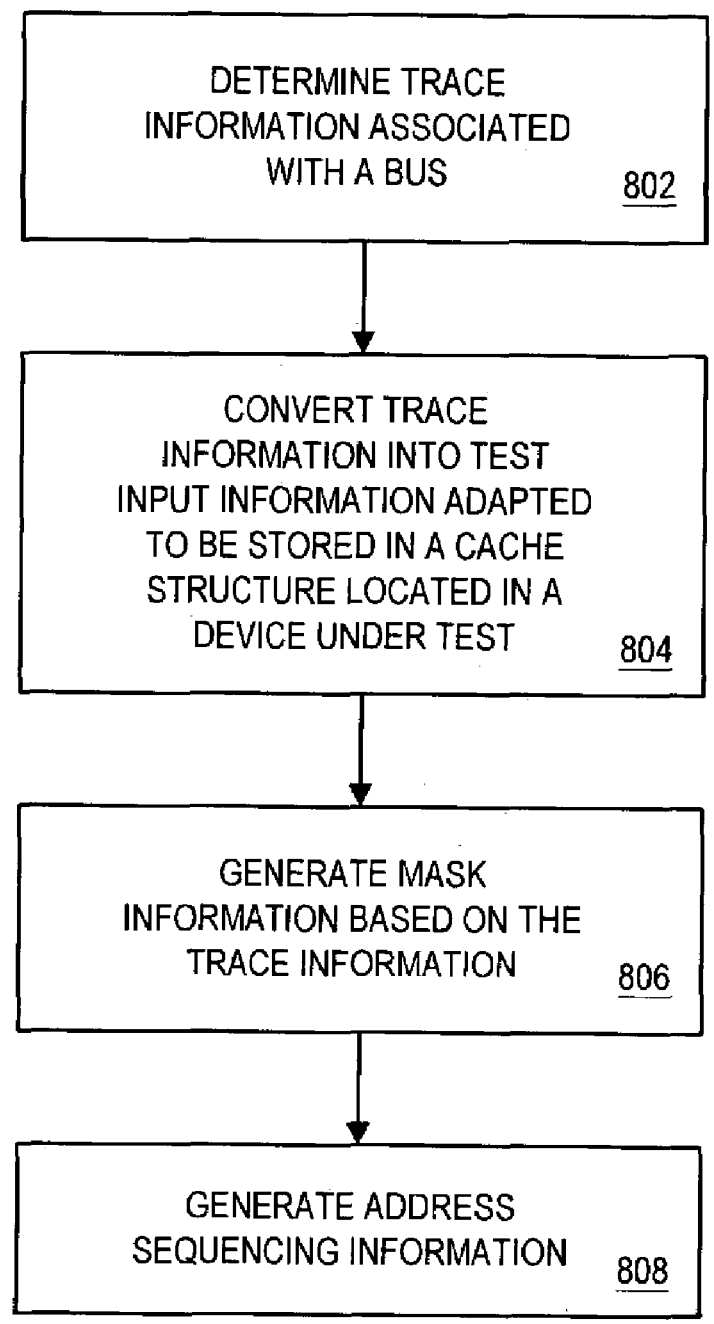
FIGS. 8 and 9 are flow charts illustrating methods of generating test information according to some embodiments.
Figure 9:
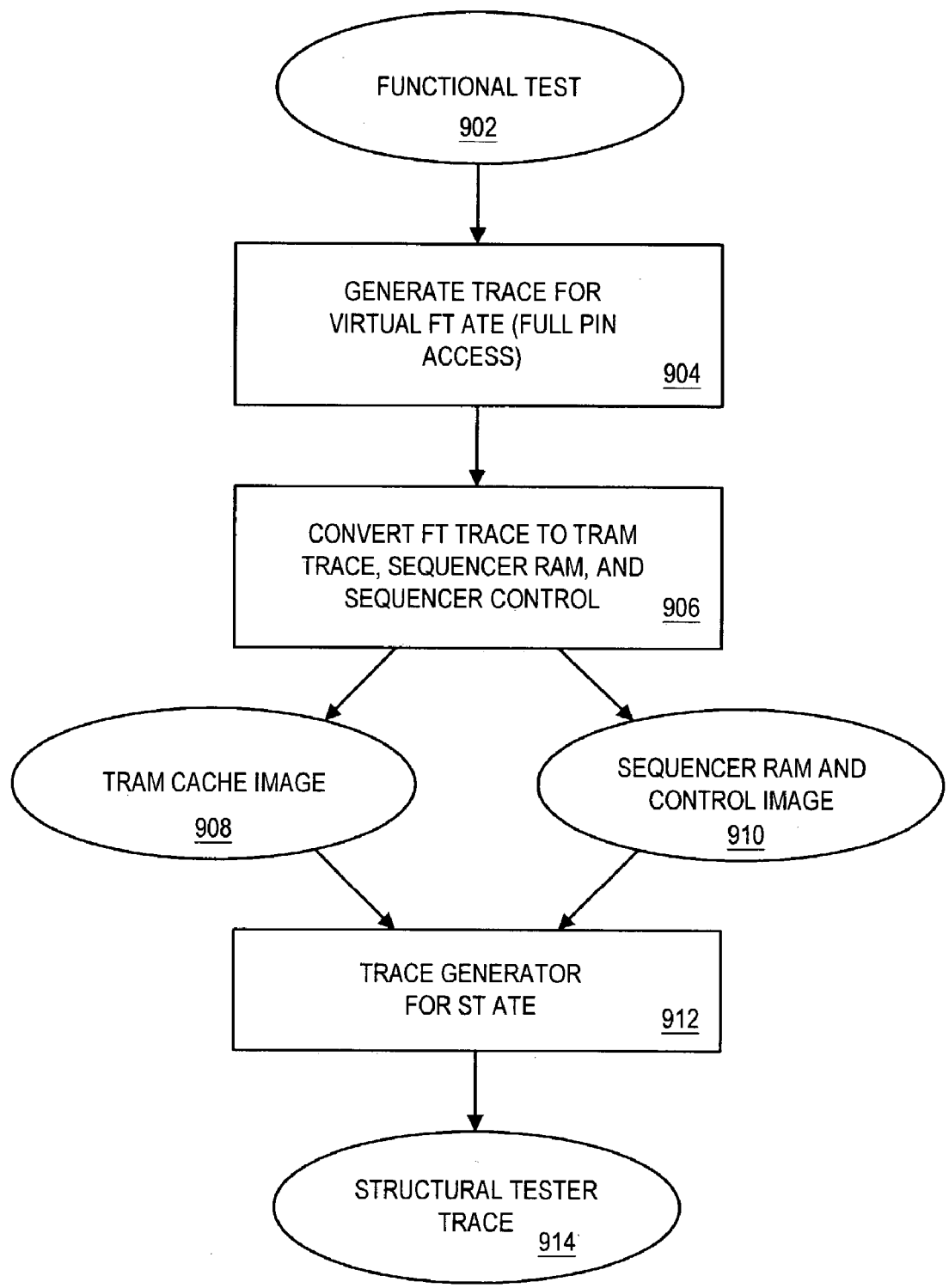

FIGS. 8 and 9 are flow charts illustrating methods of generating test information according to some embodiments. The methods may be performed, for example, by the structural tester 600 illustrated in FIG. 6 or some other device.

Referring now to FIG. 8, trace information associated with a bus is determined at 802. For example, system trace information may be captured from a processor's FSB during normal operation. At 804, the trace information is converted into test input information (e.g., information associated with input paths of the FSB) that is adapted to be stored in a cache structure 320 located in a device under test 300. For example, the trace information may be re-formatted so as to represent lines in the cache structure 320.

At 806, mask information is generated based on the trace information. Note that the test input information and the mask information might be combined (e.g., and both may be stored in a line in the cache structure 320).

According to some embodiments, address sequencing information is also generated. For example, it might be that the test input information and mask information are not stored in sequential lines of the cache structure 320. In this case, the address sequencing information may indicate an address of the cache structure 320 that should be accessed (e.g., by the sequencer 330).

FIG. 9 is another illustration of a method of generating test information according to some embodiments. In particular, a functional test is performed at 902. Note that the functional test may be associated with logic and instructions that are designed to ensure that a device under test 300 is operating properly, and may include, for example, interrupts, snoops, cache misses, and cache flushes.

At 904, a trace for a virtual Functional Test (FT) ATE device is generated (e.g., including full or substantially full pin access). That is, the appropriate value of each input path and certain output paths may be determined. By way of example, each functional test vector might have at least one bit associated with each pin of the processor. For an input pin, the bit value would be set to the input value to be driven during the test. For an output pin, one bit may represent an expected value and another bit may represent a strobe value (e.g., a value that indicates whether or not that output pin should be observed in that clock cycle).

At 906, the functional test trace is converted to a TRAM trace and sequencer RAM and control information. For example, a software application may convert a functional test vector so that information can be stored appropriately in on-die memory.

Consider a TRAM that has N bytes in each cache line. In this case, the N bytes may be split into k bytes of input pin information and m bytes of strobe information. As a result, each TRAM cache line can represent 8*k FSB input pins and 8*m FSB output pins to be observed. The sequencer RAM and control information may be associated with address sequencing information.

A TRAM cache image 908 and a sequencer RAM and control image 910 are then generated and a trace generator for a Structural Tester (ST) ATE device accesses the images at 912 to create a structural tester trace 914. The structural tester trace 914 may then be loaded into and used by a structural tester 600 in accordance with embodiments of the present invention.

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, some embodiments have been described wherein an on-die cache structure stores test information. According to other embodiments, however, an off-die memory structure instead stores the test information. Consider, for example, a Multi-Chip Module (MCM). In this case, a memory structure on one chip may store test information that can be used to evaluate the performance of another chip (or the entire MCM).

In addition, although software or hardware may have been described as performing particular functions herein, such functions could be performed using either software or hardware—or a combination of software and hardware (e.g., a medium may store instructions adapted to be executed by a processor to perform a method of facilitating an evaluation of a device under test).

The several embodiments described herein are solely for the purpose of illustration. Persons skilled in the art will recognize from this description other embodiments may be practiced with modifications and alterations limited only by the claims.

What is claimed is:

1. An integrated circuit, comprising:
   a processor core to exchange information via input paths and output paths within the integrated circuit, the input paths and the output paths being associated with a bus external to the integrated circuit;
   a cache structure to store test information;
   a sequencer to transfer the test information from the cache structure; and
   a multiplexer to receive sets of signals from (i) at least a portion of the bus and (ii) the sequencer, wherein the multiplexer is further to provide one of the received sets of signals to the processor core via the input paths.

2. The integrated circuit of claim 1, wherein the bus comprises a front side bus.

3. The integrated circuit of claim 1, wherein a first portion of the cache structure is to store the test information and a second portion is to be available for the processor core.

4. The integrated circuit of claim 1, wherein the test information is to be loaded into the cache structure from a structural test device.

5. The integrated circuit of claim 4, wherein the test information comprises test pattern information associated with bus trace information.

6. The integrated circuit of claim 4, wherein the test information comprises at least one of: (i) test input information, (ii) mask information, and (iii) address sequencing information.

7. The integrated circuit of claim 1, further comprising a result accumulator to receive information from the processor core through the output paths.

8. The integrated circuit of claim 7, wherein the result accumulator is also to receive mask information.

9. The integrated circuit of claim 7, wherein the result accumulator comprises a multi-input signature register.

10. The integrated circuit of claim 7, wherein information in the result accumulator is to be associated with a test result.

11. The integrated circuit of claim 1, wherein the input paths and the output paths are associated with substantially the entire bus.

12. The integrated circuit of claim 1, wherein the sequencer is a design for test structure on the integrated circuit.

13. An integrated circuit, comprising:
   a processor core to exchange information via input and output paths associated with a front side bus;
   a cache structure having a first portion to store test information provided by a structural test device and a second portion to be available for the processor core;
   a sequencer to transfer the test information from the cache structure to the processor core via the input paths;
   a multiplexer to: (i) receive information from both the sequencer and an input/output pad associated with the front side bus, and (ii) provide information to the processor core via the input paths; and
   a multiple input signature register to accumulate information provided by the processor core through the output paths.

14. The integrated circuit of claim 13, wherein the input paths and the output paths represent substantially the entire front side bus.

15. A method, comprising:
   setting a test mode signal for a multiplexer such that the multiplexer will provide a set of signals received from a sequencer to a processor core via input paths, wherein the multiplexer is further to receive a set of signals from at least a portion of a bus, and further wherein the multiplexer, the processor core, and the input paths are formed on an integrated circuit and the bus is external to the integrated circuit;
   sequencing test information from a cache structure to a processor core via the sequencer and the multiplexer, wherein the cache structure is formed on the integrated circuit; and
   accumulating information from the processor core via output paths associated with the bus.

16. The method of claim 15, wherein the input paths and the output paths represent substantially all of the bus.

17. A system, comprising:
   a structural tester; and
   an integrated circuit under test in communication with the structural tester via a bus, comprising:
      a processor core to exchange information via input paths and output paths within the integrated circuit, the input paths and the output paths being associated with the bus;
      a cache structure to store test information received from the structural tester;
      a sequencer to transfer the test information from the cache structure; and
      a multiplexer to receive sets of signals from (i) at least a portion of the bus and (ii) the sequencer, wherein the multiplexer is further to provide one of the received sets of signals to the processor core via the input paths.

18. The system of claim 17, wherein a first portion of the cache structure is to store the test information and a second portion is to be available for the processor core.

* * * * *